Patented Nov. 7, 1922.

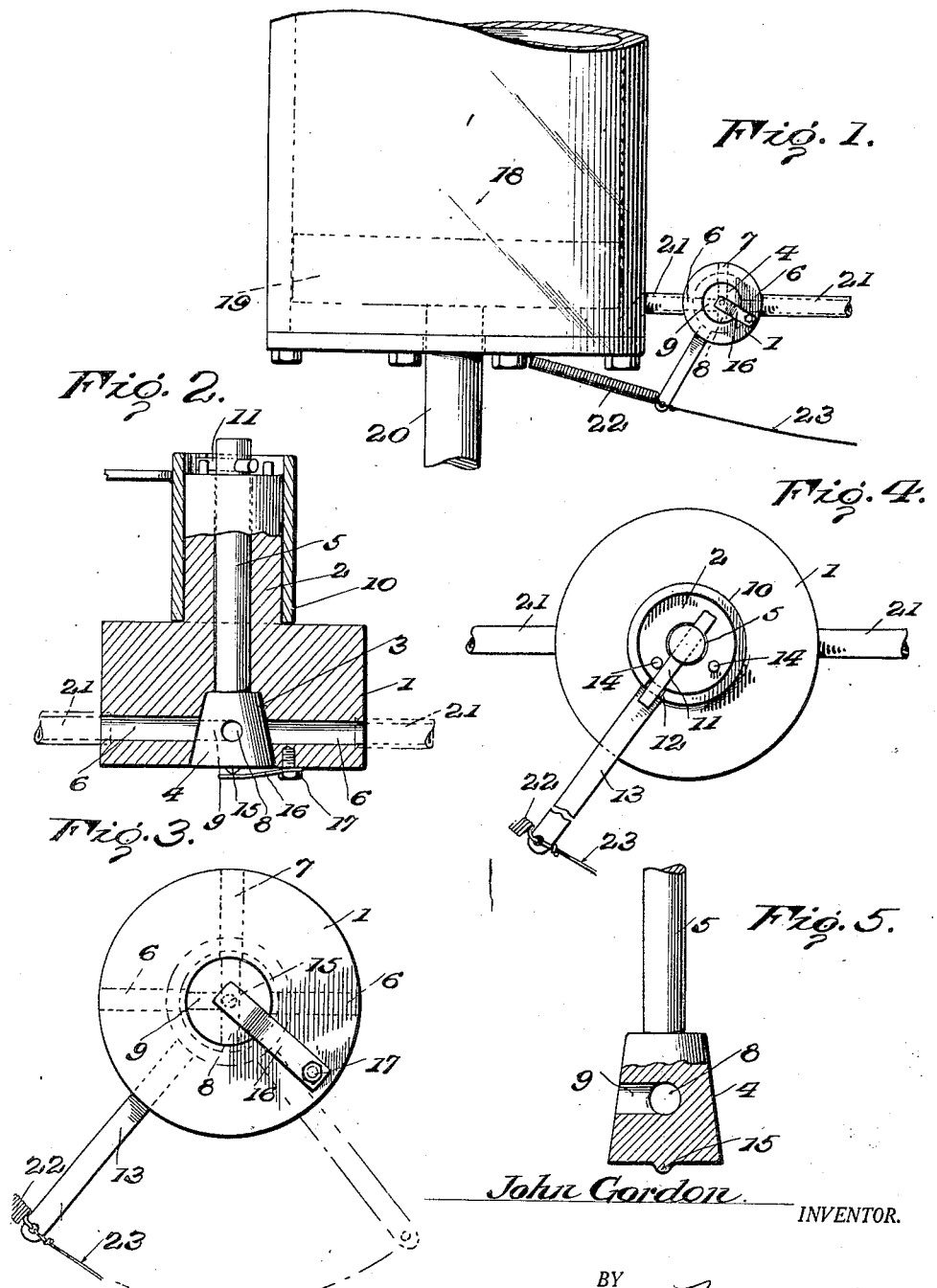

1,434,695

UNITED STATES PATENT OFFICE.

JOHN GORDON, OF SEATTLE, WASHINGTON.

ROTARY VALVE.

Application filed December 4, 1920, Serial No. 428,250. Renewed March 25, 1922. Serial No. 546,389.

*To all whom it may concern:*

Be it known that I, JOHN GORDON, a citizen of the United States, and residing at Seattle, in the county of King and State of Washington, have invented certain new and useful Improvements in Rotary Valves, of which the following is a specification.

This invention relates to an improvement in valves of the rotary type, and particularly to a leak-proof construction, in the use of which the valve may be moved to a position to control the flow of a pressure medium through a conduit, or to exhaust to the atmosphere at will.

In the drawings:—

Fig. 1 is a broken view in elevation illustrating the application of the improved valve.

Fig. 2 is a horizontal section through the valve structure.

Fig. 3 is an end elevation of the valve structure.

Fig. 4 is an opposite end elevation of the valve structure.

Fig. 5 is a sectional detail of the valve proper.

The improved valve comprises a body 1 having a lateral reduced extension 2. One face of the valve is formed with a conical valve seat 3 to receive a conical valve 4, which valve is provided with a rod 5 extending through the body and extension 2 to provide an elongated bearing for the valve.

The body 1 is formed with a diametric port 6 and with a single port 7 opening through the body in one direction from and at right angles to the port 6. The valve is formed with a diametric port 8 opening therethrough and with a lateral port 9 extending at right angles to and communicating with the port 8.

A handle sleeve 10 is mounted on the extension 2 of the valve body and extends beyond the free end of such extension. This handle sleeve serves to prevent a bendng strain on the valve stem 5. A pin 11 extends through an opening in the valve rod 5 immediately beyond the free end of the body extension 2, to thus prevent disconnection of the valve from the body, the pin 11 extending through a cut-out portion 12 in the sleeve. A handle 13 is connected with the sleeve 10 for the operation of the valve. Pins 14 extend from the body extension 2 to be engaged by the pin 11 of the valve during operation of the valve, and limit the respective positions of the valve. The conical valve 4 is provided with a projection 15 on which bears one end of a leaf spring 16, the opposite end of the spring being secured to the valve body as at 17. The wear of the valve in the valve seat is thus automatically taken up by the spring 16.

In Fig. 1 there is shown an application of the valve to the jump cylinders for lifting and lowering circular saws and the like. In this use, the cylinder 18 is provided with a piston 19 and rod 20, which piston is adapted to be operated in one direction through a fluid pressure admitted through pipe 21. The valve is connected in this pipe so that the diametric port 6 of the valve body is in line with the pipe while the port 7 of such body opens to the atmosphere.

A spring 22 is connected to the handle 13 and to the cylinder 18 to hold the valve normally in a position to exhaust to the atmosphere, that is, with the port 9 in line with the pipe 21 from the cylinder 18, and the port 8 in line with the atmospheric port 7 of the body. A connector 23, as a cord or the like, leads from the handle 13 to a position convenient to the operator, so that the valve may be moved to its opposite position, that is, with the port 8 in line with the diametric port 6 of the valve body. This establishes direct pipe connection through the valve to the cylinder.

What is claimed as new, is:

1. A rotary valve comprising a body having a lateral reduced extension, a conical valve mounted in the body and having a rod extending through and bearing in the extension, a sleeve encircling the extension, a pin passed through the valve rod beyond the extension and projecting through a cut-out portion in the sleeve to serve as an operating handle, and limiting pins fixed in the extension to be engaged by said valve rod pin to limit movement of the valve.

2. A rotary valve comprising a casing having a reduced lateral extension, said casing being formed with a conical seat and with line ports and an exhaust port communicating with said seat, a conical valve arranged in said seat, and having a rod extending through and bearing in said extension, means engaging one end of the conical valve to hold said valve in its seat, an operating handle revolvably mounted on the said lateral extension of the casing and connected to the conical valve by said means.

In testimony whereof I affix my signature in the presence of two witnesses.

JOHN GORDON.

Witnesses:
SUZANNE McLAUGHLIN,
OSCAR J. HANSON.